(No Model.)
A. KREIDLER.
SPOOL AND SUPPORT THEREFOR.
No. 521,241. Patented June 12, 1894.
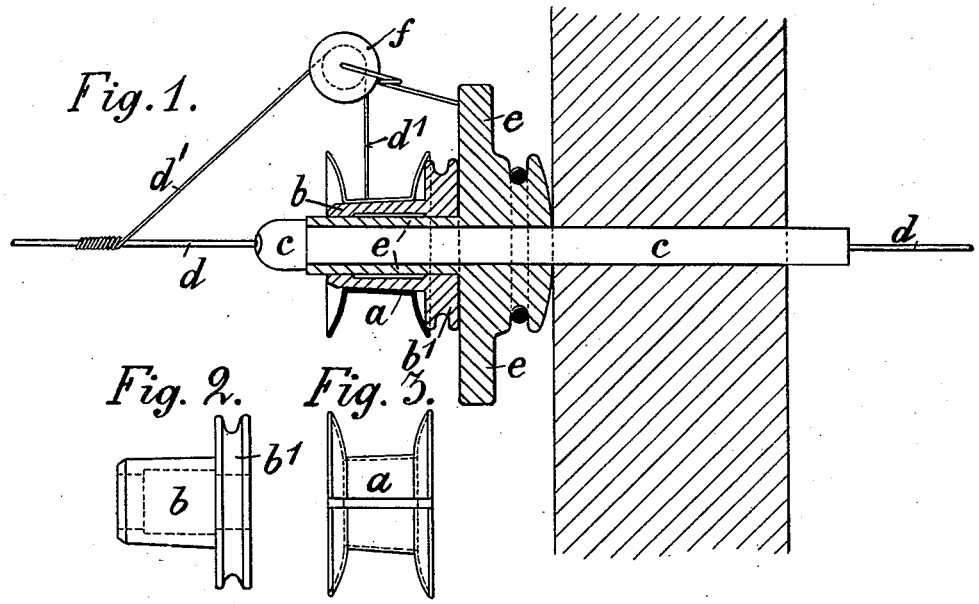
WITNESSES:
Philip Kassel
Hermann Müller
INVENTOR
Anton Kreidler
BY
Hermann Bormann
ATTORNEY.

UNITED STATES PATENT OFFICE.

ANTON KREIDLER, OF STUTTGART, GERMANY.

SPOOL AND SUPPORT THEREFOR.

SPECIFICATION forming part of Letters Patent No. 521,241, dated June 12, 1894.

Application filed July 6, 1893. Serial No. 479,774. (No model.)

*To all whom it may concern:*

Be it known that I, ANTON KREIDLER, a subject of the Emperor of Germany, residing at Stuttgart, in the Empire of Germany, have invented certain new and useful Improvements in Spools and Supports Therefor, of which the following is a specification.

My invention relates to spools in general and principally to such used in cord-covering, and has for its object to lessen the cost of manufacture of spools, to diminish the friction between spool and support and to allow of an easy manipulation of mounting and unmounting the same to and from a support or spindle.

My invention consists of the combination of a spool-support having a bushing rotatably mounted thereon and a spool adapted to be frictionally held on said bushing, and my invention further consists of the combination of a hollow spool-support provided with a rotatable bushing having a rim to which a brake band may be applied and a split spool adapted to be held unto said bushing by friction.

My invention will be more fully understood taken in connection with the accompanying drawings forming part hereof, and in which—

Figure 1 is a part of a cord-covering machine, showing in longitudinal section a spindle provided with a pulley having a long hub, over which a bushing having a brake rim is rotatably mounted and which bushing carries a spool or bobbin. Fig. 2 shows the bushing in detail. Fig. 3 illustrates a split spool.

Referring now to the drawings for a further description of my invention, $c$ is a hollow spindle or stem of a cord covering machine held in the frame work of the machine.

$e$ is a grooved pulley or disk having a long hub encircling the said spindle or stem $c$ and carrying guiding and tension devices $f$ to direct and twist a thread $d'$ or other material around a core $d$ passing through the spindle or stem $c$, when the said pulley or disk $e$ with the guiding device $f$ is rotated by a belt or other appliance.

Onto the hub of the disk or pulley $e$ is loosely but accurately fitted a bushing $b$ having a flange $b'$ to form together with a belt or other band not shown a brake to arrest if so desired a rotary motion attained from the motion of the pulley $e$.

$a$ is a spool containing the covering material $d'$, and is slipped over the bushing $b$ and held thereon by friction. For the latter purpose, the spool or bobbin $a$ may be made with an elastic bore or the bore may be provided with frictional material or the spool may be made of sheet metal slotted radially and in line with the axis of the spool as shown in Fig. 3 and further it may be made conical to fit a correspondingly shaped support or core as the bushing $b$, so that when applied to the bushing it becomes a part of and rotates or is arrested with the same. As the spools to be unwound by such machines are many and a uniform tension of the thread or other material $d'$ from such spools is very important for obtaining the best results in covering cores of any material, it is obvious that each spool containing the covering material must be accurately bored and finished to reduce friction, jamming, &c., between the revolving part of the machine and the spool, whereas according to my invention and as hereinbefore described only one part, the bushing has to be accurately fitted to the revolving part of a braiding or similar machine, while the spools may be of approximately the same bore and be frictionally attached by simply slipping them onto the bushing $b$, and should the bore be too large, paper strips or wedges may be inserted or if the spools are heavy, set screws or similar devices may be applied to produce friction. Preference however is given to the construction as shown in Figs. 1 to 3, in which the bushing is tapered at its exterior and the spool-bore is correspondingly tapered. The spool may if desired be split, to clamp the same more firmly to the bushing. In this case it is desirable to make the spool of sheet metal as indicated in the drawings.

Having thus described the nature and objects of my invention, what I claim as new, and desire to secure by Letters Patent, is—

1. In combination with a cord covering machine, a spool-support comprising a hollow spindle, a pulley having a long hub mounted on said spindle, a bushing rotatably fitted to said hub, and spools adapted to be slipped over and held frictionally to said bushing, substantially as and for the purposes set forth.

2. In combination with a cord covering machine, a spool-support comprising a hollow spindle, a pulley having a long hub rotatably fitting said hub and provided with a rim to carry a brake band and split spools of sheet metal adapted to be held on said bushing by friction, substantially as and for the purposes set forth.

Signed at Stuttgart, Kingdom of Würtemberg, German Empire, this 15th day of June, 1893.

ANTON KREIDLER.

Witnesses:
A. FRAENKEL,
E. SPIEGEL.